(12) United States Patent
Brun et al.

(10) Patent No.: US 6,662,283 B1
(45) Date of Patent: Dec. 9, 2003

(54) SECURE MEMORY MANAGEMENT METHOD

(75) Inventors: Philippe Brun, La Ciotat (FR); Charles Coulier, Roquevaire (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/567,062

(22) Filed: May 8, 2000

Related U.S. Application Data

(63) Continuation of application No. PCT/FR98/02336, filed on Nov. 2, 1998.

(30) Foreign Application Priority Data

Nov. 7, 1997 (FR) .............................................. 97/14054

(51) Int. Cl.⁷ .......................... G06F 12/00; G06F 13/00
(52) U.S. Cl. ............................ 711/163; 707/9; 713/165
(58) Field of Search ................................. 711/163, 164; 707/203, 9; 713/165

(56) References Cited

U.S. PATENT DOCUMENTS 4,734,568 A    3/1988    Watanabe
4,858,117 A  * 8/1989    DiChiara et al. ........... 711/208
5,282,247 A  * 1/1994    McLean et al. ............. 711/164
6,243,796 B1 * 6/2001    Otsuka ....................... 711/163

FOREIGN PATENT DOCUMENTS

| EP | 0152024 A    |   | 8/1985  |
|----|--------------|---|---------|
| EP | WO 88/09019  | * | 11/1988 |
| FR | 2628555 A    | * | 9/1989  |

* cited by examiner

*Primary Examiner*—Reginald G. Bragdon
*Assistant Examiner*—Pierre M Vital
(74) *Attorney, Agent, or Firm*—Burns, Doane, Swecker & Mathis, L.L.P.

(57) ABSTRACT

The invention provides a method for reducing occupancy of descriptors used for protecting files in storage. The method includes separating the functions files are going to be subjected to from the protection modes to which said functions subscribe. The descriptors comprise a number of octets equal to the number of protection modes proposed. The bits of these octets, depending on whether they are active or inactive, refer to function memory words whose number is directly equal to the number of active bits in the mode memory words. The function memory words comprise references to secret codes to be used for implementing the desired security functions.

8 Claims, 3 Drawing Sheets

SECURE MEMORY MANAGEMENT METHOD

This is a continuation of International Application No. PCT/FR98/02336, filed Nov. 2, 1998, and claims priority from French Patent Application No. 97/14054, filed Nov. 7, 1997, the contents of which are incorporated herein by reference.

BACKGROUND OF THE INVENTION

The present invention relates to a secure memory management method, in particular a method of managing a memory of a smart card communicating with a terminal. It could nevertheless be applied to any other type of memory. The invention is particularly beneficial when it is necessary to take care to preserve the memory capacity of the memory in order to manage the security of the memory. The main problem to be solved is the amount of memory occupied by the system used to protect the files.

The invention will be particularly described in the case of an application to a smart card. It is nevertheless entirely transposable to other fields. It is known in the art, in particular in the smart card art, to organize the security of a transaction between an operating system and files in accordance with various modes. These modes are discussed in detail later. For the moment it may be assumed that there are secret codes, authentication and security message protection modes. There are also several types of processing to which the files can be subjected. Essentially their contents can be read. Their contents can also be written and erased. It is also possible to envisage the creation or the deletion of a file. An entire file can also be invalidated, after which it can be rehabilitated. In electronic purse applications, in which the file represents an amount of money, amounts of money can be debited or credited. Other functions can be provided in addition to the above seven functions. Accordingly, if debit or credit operations are envisaged in a smart card purse application, a balance reading function can be provided that consolidates all previous debit and credit operations to establish a balance. A debit ceiling can also be applied whereby a debit is authorised only if it is below a ceiling.

The remainder of this description is limited to three security modes and to seven functions which can lead to modification of files. This is in order to clarify the explanation and because the description corresponds to a preferred use which is also the one most frequently employed.

In the prior art, during the development of an operating system, or more generally of a memory management system, each file is associated with a file descriptor. Before operating on a file, the operating system or the management system reads the content of the descriptor and limits its actions in accordance with constraints imposed by the file descriptor. In the field of microcomputers, the management system is made up of a set of programs. In the field of smart cards, the corresponding operating system is implemented in hardware to prevent a hacker, by changing its nature, changing the whole of the protection mode that has been constructed.

During the development of an operating system, the number of memory words that a file descriptor must contain to cover all eventualities is high because each file can be protected in each of the intended modes (there are three modes in this example) for each of the intended functions (there are seven functions in this example). In this example, the number of memory words required is 21 (3×7). Given that a smart card can hold up to twenty files, a large number of memory words is needed to constitute the general descriptor. In this example it would be 420. If one byte is allocated to each memory word, with a memory size of the order of 1 kilobyte it would be necessary to allocate almost half the memory to the file descriptor. That is much too much.

Each element of information stored in a smart card is a file, whether it is a secret code, a credit, a debit, a card identity, a card serial number, etc. The problem of minimising the size of the descriptors is particularly acute in the field of smart cards because the physical dimensions of the microchip increase as the size of the memory increases. Being incorporated into a card, a microchip is subject to mechanical stresses by the cardholder. It can be folded and bent many times. The microchip can eventually break. The bigger the microchip, the more easily it breaks. Also, the cost of the component is increased and likewise the cost of incorporating it into the card.

The object of the invention is to remedy the excessive amount of memory occupied by the file descriptors, which is particularly beneficial in the field of smart cards. It is still beneficial whenever it is a matter of reducing space occupied unnecessarily, however.

To solve the above problems, it has been envisaged in the prior art to design fixed operating systems, i.e. operating systems dedicated to a given application. The disadvantage of this approach is that, once decided on, the solution cannot subsequently be altered. If anything has to be modified, then the entire operating system has to be rebuilt. On the other hand, providing users with a flexible operating system runs up against the problem of the amount of memory occupied by descriptors.

SUMMARY OF THE INVENTION

The invention aims to remedy this memory occupation problem by exploiting the fact that, although some files require precise security modes for some operations, others do not require any at all. The invention exploits this fact to constitute descriptors which occupy varying amounts of memory. It is shown that the method of the invention achieves a space saving of at least 50% and in most cases of at least 80%.

The invention divides the descriptor into two parts. A first part is reserved for the security modes. It is of fixed length. Its memory occupation expressed as a number of mode memory words is proportional to the number of modes envisaged. A second part concerns function memory words. The function memory words are present in the second part only if they are invoked in the first part.

The invention therefore provides a secure method of managing a memory in which:
  files in the memory are allocated file descriptors,
  said file descriptors include information on security modes needed to apply processing functions to data stored in the files, and
  the security of the files in the memory is managed in accordance with the content of said file descriptors, characterised in that:
  the security modes are divided into M different types and the functions are divided into N different types,
  a first group of M mode memory words is created in the descriptor of each file, the length in bits of the mode memory words being at least equal to the number N of different types of functions,
  the functions are stored in a particular order, the positions of the bits in the mode memory words conforming to that order, and the bits of the mode memory words are rendered active or inactive according to whether a security mode must or must not be applied on application of a function to a file to which a descriptor relates.

BRIEF DESCRIPTION OF THE DRAWINGS

The invention will be understood better after reading the following description and referring to the accompanying drawings. The drawings are given by way of illustrative and non-limiting example of the invention. In the drawings.

DETAILED DESCRIPTION

Figures 1, 4:
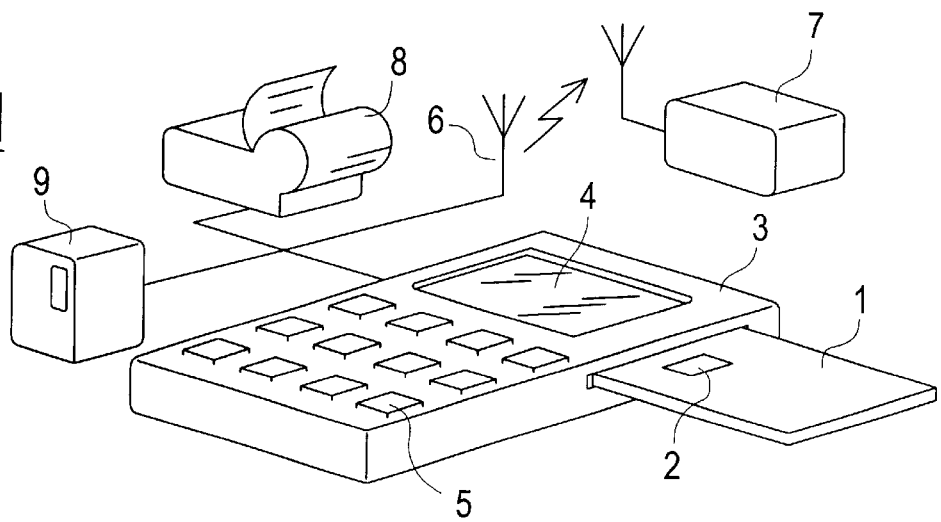
FIG. 1 shows a non-limiting application of the invention to a transaction between a smart card and a terminal.
FIG. 4 is a flowchart of operations performed in the method of the invention.

FIG. 1 shows a smart card 1 provided with a microchip 2 which communicates with a reader 3. The reader 3 is a terminal which is generally provided with a screen 4 and a keypad 5 to enable an operator to satisfy a need. For example, the reader 4 is connected to a central unit 7 by connecting means 6 for exchanging information (a radio link in this example). The central unit is the management department of a bank, for example. In another example, the terminal 3 communicates with a printer 8 which prints the result of a financial transaction initiated by the operator. Alternatively, the terminal 3 communicates with a dispenser 9 of goods or services, for example a drinks dispenser.

Figure 2:
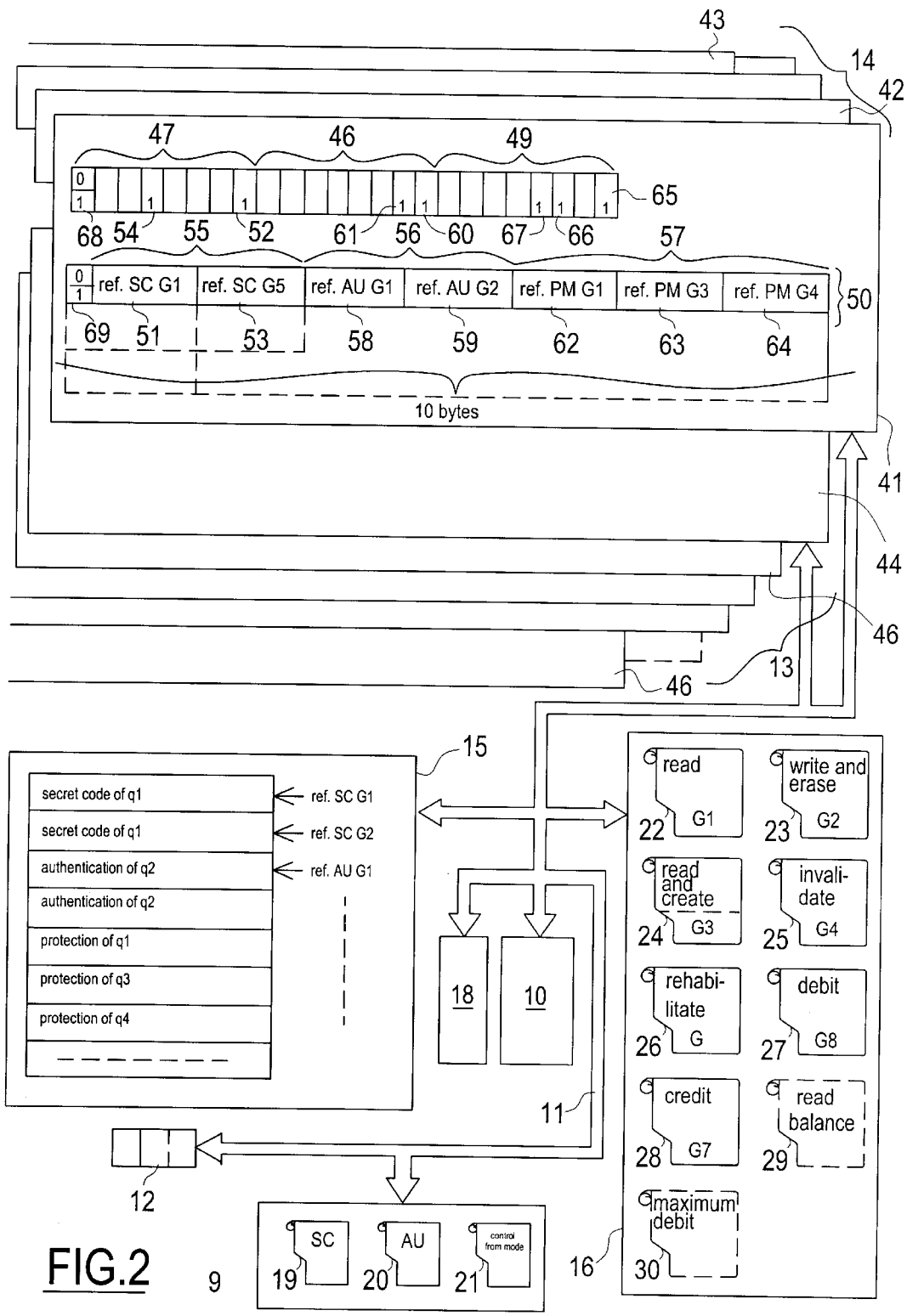
FIG. 2 shows the architecture of an operating system used to implement the method of the invention and preferably contained in the microchip.

FIG. 2 shows the architecture of the microchip 2 and its operating system. The microchip 2 essentially comprises, in an integrated circuit, a microprocessor 10 communicating via a data, address and control bus 11 with an input-output interface 12. The interface 12 is used to communicate with the reader 3. The microprocessor 10 also communicates via the bus 11 with a set of files 13 whose use is conditioned by a set 14 of descriptors. The files 13 can comprise all the files envisaged until now. They can also include a file 15 of secret codes whose use is explained later and which is here distinguished from the others only to simplify the explanation of the invention. The microchip also includes a set of programs stored in program memories 16 and 17, which are respectively a function memory used to process the files and a security mode memory used at the time of application of those functions to the files. This separation of the memories 16 and 17 is entirely to simplify the explanation of the invention. In practice the microprocessor 10 can have a single program memory and all the programs can even be compiled into a single main program.

The system operates as follows: the programs are loaded from memories 16 and 17 into a scratchpad memory 18 together wit information from the files 13 to 15 on which the processing is to effected. The microprocessor 10 performs on the data the processing embodied in the programs.

In the smart card art, the files 13 to 15 are preferably stored in non-volatile erasable programmable memory and the programs in the memories 16 and 17 could be stored in memories that are merely programmable. However, to cater for future changes, the latter memories can also be programmable and erasable.

Figure 3A:
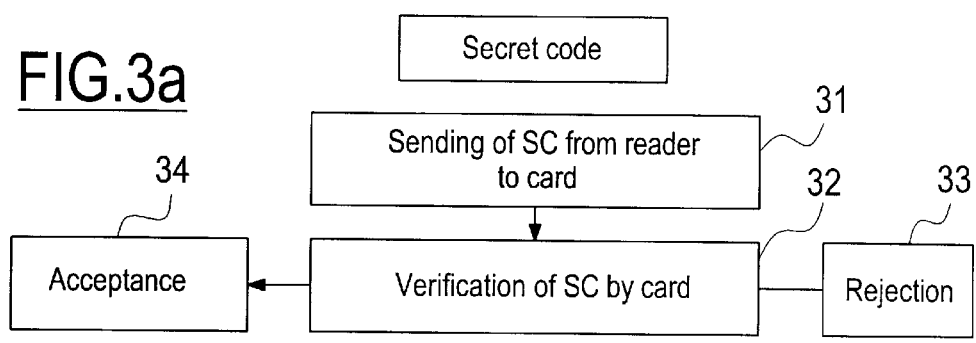
FIGS. 3a to 3c show security modes envisaged in one example of the invention.
Figure 3B:
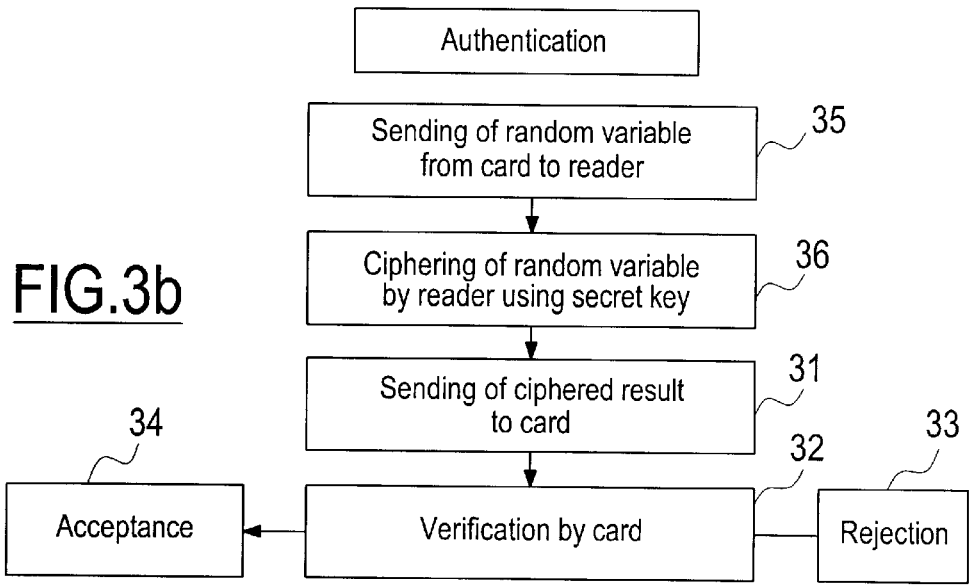
Figure 3C:
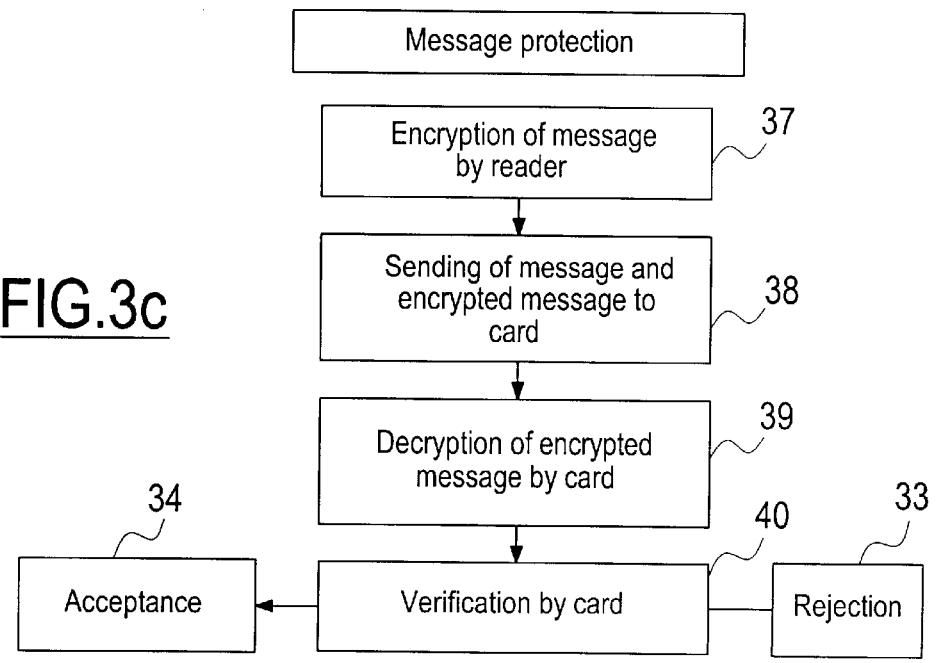

FIGS. 3a to 3c show three protection modes which are respectively and arbitrarily denoted Secret code, Authentication and Security message. These protection modes are associated with respective programs CS, AU and SM, 19 to 21, in the mode memory 17. There are three security modes, as mentioned above.

The functions which can be applied to the files include, in one example, read, write and erase, delete and create, invalidate, rehabilitate, debit and credit functions 22 to 28. To these seven functions can be added other functions such as a balance reading function 29 and a debit ceiling function 30. Nevertheless, the remainder of the description will be restricted to the seven functions 22 to 28, for reasons explained later.

The functions and modes in fact correspond to sequences of instructions which must be loaded by the microprocessor 10 into the scratchpad memory 18 to be executed and thereby contribute to the execution of the formality that they represent.

Rather than identifying each function separately, they can be grouped into groups of functions corresponding to profiles of users who have to execute the corresponding functions. In this case, there are preferably seven groups G1 to G7. These groups are entirely for simplifying management, in particular for reducing the amount of memory occupied by the file descriptors. For example, the balance reading function could be allocated to group G1. This means that if a protection mode in accordance with the invention is applied to a group, that protection mode will apply equally, in the case of group G1, to reading information and to reading a balance. Similarly, the debit ceiling function 30 can be allocated to the debit group G6. This means that the protection mode allocated to the mode G6, and to be applied to the group G6, will apply in this case whether the operation concerned is a debit operation or a debit ceiling operation.

FIG. 3a shows a secret code protection mode. In this case, a secret code CS is sent from the reader to the card in an operation 31 and in an operation 32 the card verifies that the secret code it has received is compatible with what it was expecting. Depending on the result of operation 32, the security mode leads to rejection 33 or acceptance 34 of the function and its execution. Note that the secret code can be sent in encrypted form or not. In practice the secret code is transmitted over the link to which the interface 12 is connected. When encryption is referred to in the remainder of the description, it means conversion from one character string to another character string in accordance with a mode known to the card and to the reader. In contrast, references to "ciphering" indicate a mode known to only one of the two units.

The authentication process shown in FIG. 3b is made up of substantially the same operations but the sending 36 of a secret key from the reader to the card is preceded by the sending 35 of a random number from the card to the reader (or vice-versa). The random number is enciphered by the reader in an operation 36 using the reader's secret key. In principle an operation of this kind is performed only once, on starting a transaction session between a smart card and a reader.

In FIG. 3c, the security message mode requires the reader to encipher the message in an operation 37. The unciphered message, or at least a part of the uncipered message, and the enciphered message are sent to the card in an operation 38. In an operation 39 the card decrypts the message and compares it to the part in clear that it has received. A comparison operation 40 leads to rejection 33 or acceptance 34, as before. The special feature of this security mode is that it applied to every exchange between the card and the reader.

The message can include a data part and a control part and the part which is encrypted can be all or part of either or both of these parts. The operation can also be conducted in the reverse direction, from the smart card to the reader, rather than from the reader to the smart card.

In the context of the invention a protection mode is therefore a series of instructions executed by the processor 10 to perform each of the preceding verifications.

Having explained what a protection mode consists of, how the method of the invention works will now be explained.

In accordance with the invention, the file descriptors 14 include descriptors 41 to 43 allocated to respective files 44 to 46. Each descriptor, and therefore the descriptor 41 allocated to the file 44, includes three mode memory words 47 to 49. It includes as many mode memory words as there are different protection modes. Here three modes have been described with reference to FIGS. 3a to 3c, but others could be provided. In one example, the mode memory words are bytes, although this is not mandatory. Each memory word 47 (each byte) includes a number of bits at least equal to the number of functions (or groups of functions) that can be designated. There is therefore a close correlation between choosing a number of functions less than or equal to eight (preferably equal to seven) and adopting one byte for each mode memory word.

If the number of functions is greater, two bytes can be adopted for the mode memory words, in which case it will be possible to define up to sixteen different types of functions.

By convention, each mode memory word 47 to 49 is allocated a given protection mode. Thus the word 47 is allocated the secret code protection mode implemented by the program 19 and shown in FIG. 3a, the word 48 is allocated the authentication mode implemented by the program 20 and shown in FIG. 3b and the word 49 is allocated the message security mode implemented by the program 21 and shown in FIG. 3c.

The bits in each mode memory word are stored in a manner that corresponds to a predetermined order of the functions or groups of functions 22 to 28. For example, the right-hand bit of each word 47 to 49 is allocated the function 22, the next bit to the left is allocated the function 23, and so on, the seventh being allocated the function 28.

Some of the mode memory word bits are active. Here this active state is symbolised by the presence of a 1. The inactive state is equivalent to a binary zero which corresponds to an empty box. The presence of a 1 in the first bit on the right of the memory word 47 of the descriptor 41 signifies that, for the operations or functions of the group G1 22 (read), the file 44 must be processed in accordance with the secret code mode 19. The presence of a 1 in the first bit on the right of the mode memory word 48 also signifies that, for the functions of the group G1 22 (read), the file 44 must be processed in accordance with the authentication protection mode: program 20, FIG. 3b. Similarly, the memory word 49 having a 1 in the first bit on the right indicates that the file 44 must also be protected for read operations of the group G1 22 by a security message operation. Accordingly, the three protection modes must be run each time the file 44 is read.

The word 47 also indicates that, for rehabilitation operations of group G5 26, the file 44 must be processed in accordance with the secret code protection mode. The word 48 indicates that, for writing and deleting operations of group G2 23, the file 44 must be processed in accordance with the authentication mode. The memory word 49 indicates that, for deletion and creation operations of group G3 24, and invalidation operations of group G4 25, the file 44 must be processed by the security message procedure.

In other words, whenever the processor 10 wishes to run one of the functions in the memory 16, it looks up which group of functions the function belongs to (unless it is an individual function) and looks in the mode memory words of the descriptor to see if there is a bit in the active state at a position that corresponds to the envisaged function. For example, no particular protection mode is envisaged for the debit and credit functions 27 and 28 in this example. Execution of the debit or credit function can be run normally. In contrast, if there is an active bit, the processor must run the corresponding verification.

As previously pointed out, all the protection modes include enciphering, deciphering and verification operations. In practice the keys for these enciphering, deciphering and verification operations are stored in the memory 15. They could be stored in the descriptor, but this would be disadvantageous because a key is normally a very large set of bits. For example, an enciphering key can contain up to 128 bytes. When such verification is necessary, the descriptor 41 includes a set 50 of function memory words including reference to keys contained in the memory 15 and which must be used to run the required protection mode.

Firstly, the mode of storing the memory words 50 in the descriptor 41 is related to the number and position of active bits in the memory words 47 to 49. Accordingly, the first memory word of function 51 present in the set 50 relates to the first bit in the active state (the right-hand bit) of the memory word 47. Consequently, this first function memory word 51 relates to the bit in the active state in the memory cell 52 of the memory word 47. As the memory word 47 relates to the secret code protection mode, the reference contained in the function memory word 51 is a secret code reference. As it relates to the first bit, it relates to the group G1 22. This is why the byte 51 carries the reference ref C5 G1. Likewise, the byte 53 in which the memory word 53 relates to the bit 54 which relates to the group G5 26. The group 55 of function memory words relates to the secret code protection mode. It is followed by a group 56 of function memory words relating to the authentication protection mode and by a group 57 of function memory words relating to the security message protection mode.

In the group 56, the memory words 58 and 59 relate to the bits 60 and 61 of the word 48. Similarly, in the group 57, the words 62 to 64 relate to the bits 65 to 67 of the word 49. The function memory words include a reference to a key to be used in the protection mode concerned to apply the function to the data of the file to which the descriptor relates. A reference associated with a mode is identified in the respective function memory words 51, 53, 58, 59, 62–64 by the respective correspondence between the place among the active mode bits 52, 54, 60, 61 and 65–67 and the place of the function memory word among the function memory words.

Note that this approach has imposed the presence of three mode memory words: the words 47, 48 and 49, and seven function memory words: the words 51, 53, 58, 59, 62, 63 and 64. This makes ten words in total, and therefore ten bytes in the preferred example, compared to the 21 words or 21 bytes mentioned in connection with the prior art. The secret code or authentication or security message references are identified by counting the number of active bits in a mode memory word and allocating a place in the set 50 to the function memory word which conforms to the order of the active bits of the mode memory words.

Using these references, the microprocessor 10 reads the secret codes in the memory 15 and then performs its enciphering, deciphering and verification operations.

The invention has two further special features. A first of these special features concerns a fault bit 68. The bit 68 can be one bit of one of the bytes serving as mode memory words 47 to 49 since in one example the number of functions is limited to seven. The meaning of the fault bit is as follows. If a mode bit relating to a group of functions is in the inactive state, it follows from what has been stated previously that the function concerned can be implemented without restrictions. The fault bit modulates the meaning of the expression "without restrictions", as it were. If the bit 68 is in its inactive state, i.e. at 0, execution of the function is effectively free of restrictions. The function can be executed. If the fault bit 68 is in its active state, however, this means that all the functions of a given protection mode which are not authorised unconditionally are prohibited. In the present instance, the function 1 and the function 5 relate to the mode of the word 47, the functions 1 and 2 to the mode of the word 48 and the functions 1, 3 and 4 to the mode of the word 49. Consequently, in this example only the functions 6 and 7 would be free of restrictions. These would be the only functions that would be authorised without security features or completely prohibited, depending on the 0 or 1 state of the fault bit 68.

Furthermore, each reference 51, 53, etc. to a secret code can be coded on seven bits. The leading bit 69 of the reference word is then a validation bit. The validation bit has similar consequences to the fault bit. Depending on its active or inactive state, execution of the function is purely and simply rejected or the function is executed subject to a successful outcome of the protection mode concerned.

Accordingly, for the file 44, the secret code of the function memory word 51, ref CS G1, will be used for the read function (function group G1, program 22, bit 52), if the bit 69 of the memory word 51 is in the inactive state. In contrast the reference will not be used and it will not be possible to read the file 44 if the bit 69 is in the active state.

FIG. 4 summarises the operations described so far. The method according to the invention starts with the request to execute a new function in step 70. After this step, the operating system runs a test 71 to find out if there is a bit in the active state in the descriptor 41 of the file 44 concerned and for the function concerned. If this is not the case, for example if the function is a debit or credit function, a test 72 is used to test the value of the fault bit 68. If the fault bit is active, execution is rejected in step 33. On the other hand, if the fault bit 68 is inactive, the function is executed in step 73.

If there is an active bit in the mode memory word, words 47 to 49, for the file and the function concerned, the operating system first determines which function memory mode corresponds to the protection mode. The operating system simply counts the active bits in the words 47, 48, 49 to reach a mode memory word to which it relates. It looks at that place in the set 50 for the reference to the protection mode concerned. It looks in the reference in a test 74 to see if the validation bit 69 of the reference is active. If it is active, the operating system causes execution of the projected function to be rejected in step 33. If it is inactive, the operating system applies the protection mode determined during a step 75. The application of this protection can itself lead to failure or success.

Applying the protection includes a step of using the reference present in the function memory words as an address to look up the secret code, the authentication code or the security key to be used in the memory 15 to perform the enciphering or deciphering implied by the projected verification operation.

The bits 68 and 69 are in the inactive state when the files are customised. Afterwards, after verifying conformity, they can be activated to invalidate the functions that are no longer to be authorised, For example, in the event of fraud on the card, the operating system can change the state of the bit 68 or 69 to disable the card.

The number of modes being small, in general three, and the number of functions being higher, until now it has been indicated that it is preferable to organise the descriptor so that it includes as many mode memory words (which are mandatory) as there are modes and a variable number of implied function memory words. It is equally possible to create as many function memory words (which are mandatory) as there are functions to be implemented and to create mode memory words each time that the conjunction of the two is justified. In effect, the eminently complementary nature of the subroutines 19 to 21 and 22 to 30 makes such permutation entirely feasible. To clarify this, although the protection modes are different from the functions, it is possible in this description to substitute function for mode and mode for function and obtain the same result.

What is claimed is:

1. Secure method of managing a memory (13–15) in which:

files (44) in the memory are allocated file descriptors (41), said file descriptors include information (47–49) on security modes needed to apply processing functions (50) to data stored in the files, and the security of the files in the memory is managed (40) in accordance with the content of said file descriptors, characterised in that:

the security modes are divided into M different types (19–21) and the functions are divided into N different types (22–28), a first group (47–49) of M mode memory words is created in the descriptor of each file, the length in bits of the mode memory words being at least equal to the number N of different types of functions, the functions are stored in a particular order (G1–G7), the positions (52–54) of the bits in the mode memory words conforming to that order, and the bits of the mode memory words are rendered active or inactive according to whether a security mode (47) must or must not be applied on application of a function (G1) to a file to which a descriptor relates.

2. Method according to claim 1 characterised in that:

a second group (50) of function memory words, the number of which varies, is created in the descriptor of each file, the variable number of function memory words being equal to the number of active bits in the mode memory words, and the function memory words include a reference of a key (ref CS G1) to be used in the security mode concerned to apply the function to the data of the file to which the descriptor relates.

3. Method according to claim 2 characterised in that a reference is identified in the function memory words associated with a mode by the correspondence between the place (52) of the active mode bits in the mode memory words and the place (51) of the function memory word in the function memory words.

4. Method according to claim 1 characterised in that a fault bit (68) is placed in a mode memory word to determine the protection mode of all the functions for which no bits is in the active state in a mode memory word.

5. Method according to claim 1 characterised in that a validation bit (69) is stored in the function memory words to authroise or not application of the security mode determined to the file concerned.

6. Method according to claim 1 characterised in that:

a descriptor is searched (71) for an active mode bit for an envisaged function, if there is no active mode bit for an envisaged function, the value of the fault bit is tested (72) and execution of the function is authorised (73) or not (33) according to the value of the fault bit, if there is an active mode bit for an envisaged function, the value of the validation bit of the key reference contained in the function memory word is tested (74), and depending on the value of the validation bit, either the security mode is applied (74) beforehand to the application (73) of the function to the file to which the descriptor relates or the projected application is rejected (33).

7. Method according to claim 1 characterised in that the memory words are bytes.

8. Method according to claim 1 characterised in that the security modes include:

a mode (47) entailing sending a secret code, encrypted or not, between a smart card and a smart card reader, a mode (48) entailing first sending a random number, encrypted or not, between a smart card and a smart card reader, followed by sending a secret code, encrypted or not, between the smart card reader and the card, and a mode (49) entailing sending a message, encrypted or not, between a smart card and a smart card reader, part of which message is transmitted unenciphered and in a form enciphered by means of a secret key.

* * * * *